June 16, 1936.  J. J. TATUM  2,044,515
CAR BODY CONSTRUCTION
Original Filed Aug. 9, 1934   7 Sheets-Sheet 1
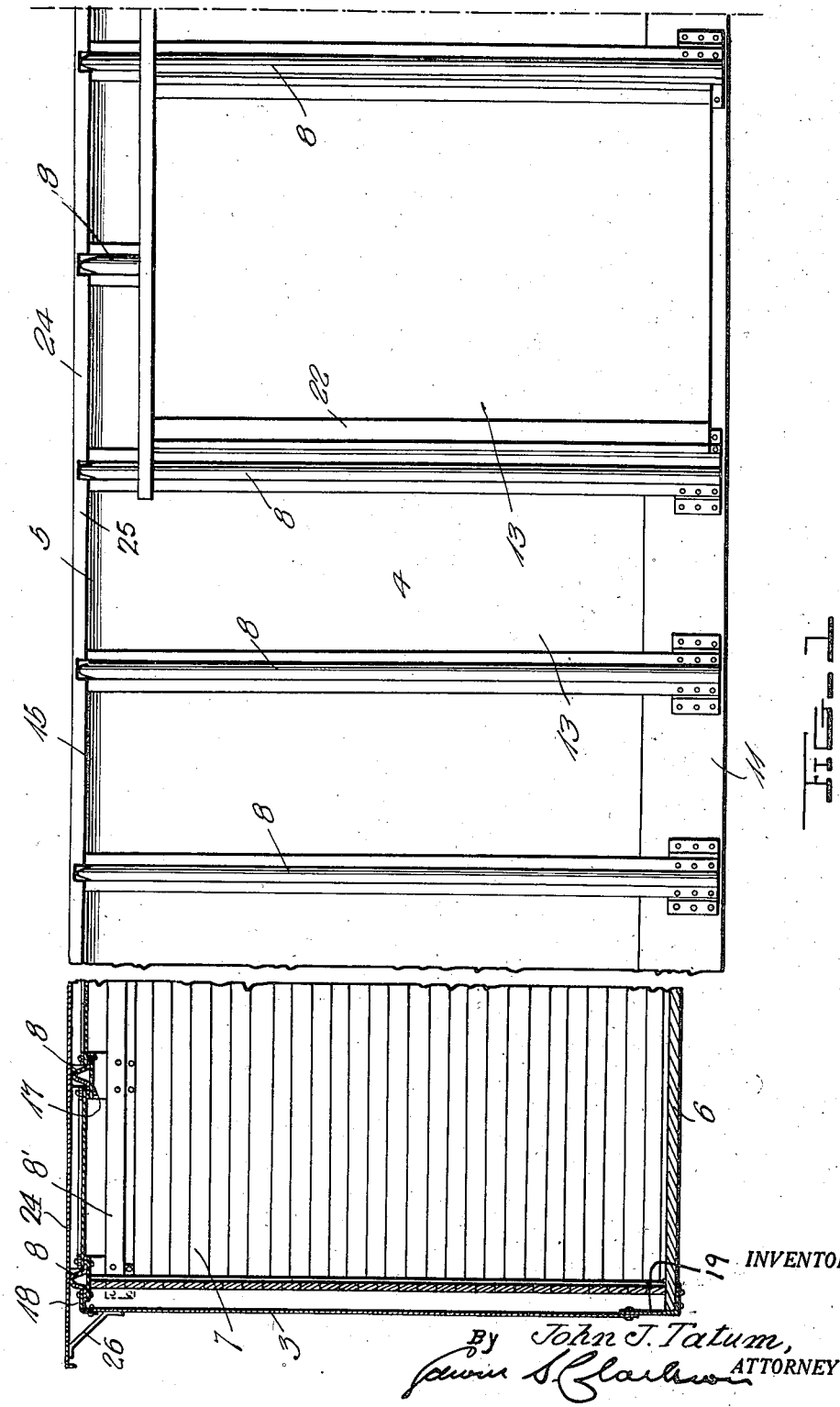
INVENTOR.
By John J. Tatum,
ATTORNEY

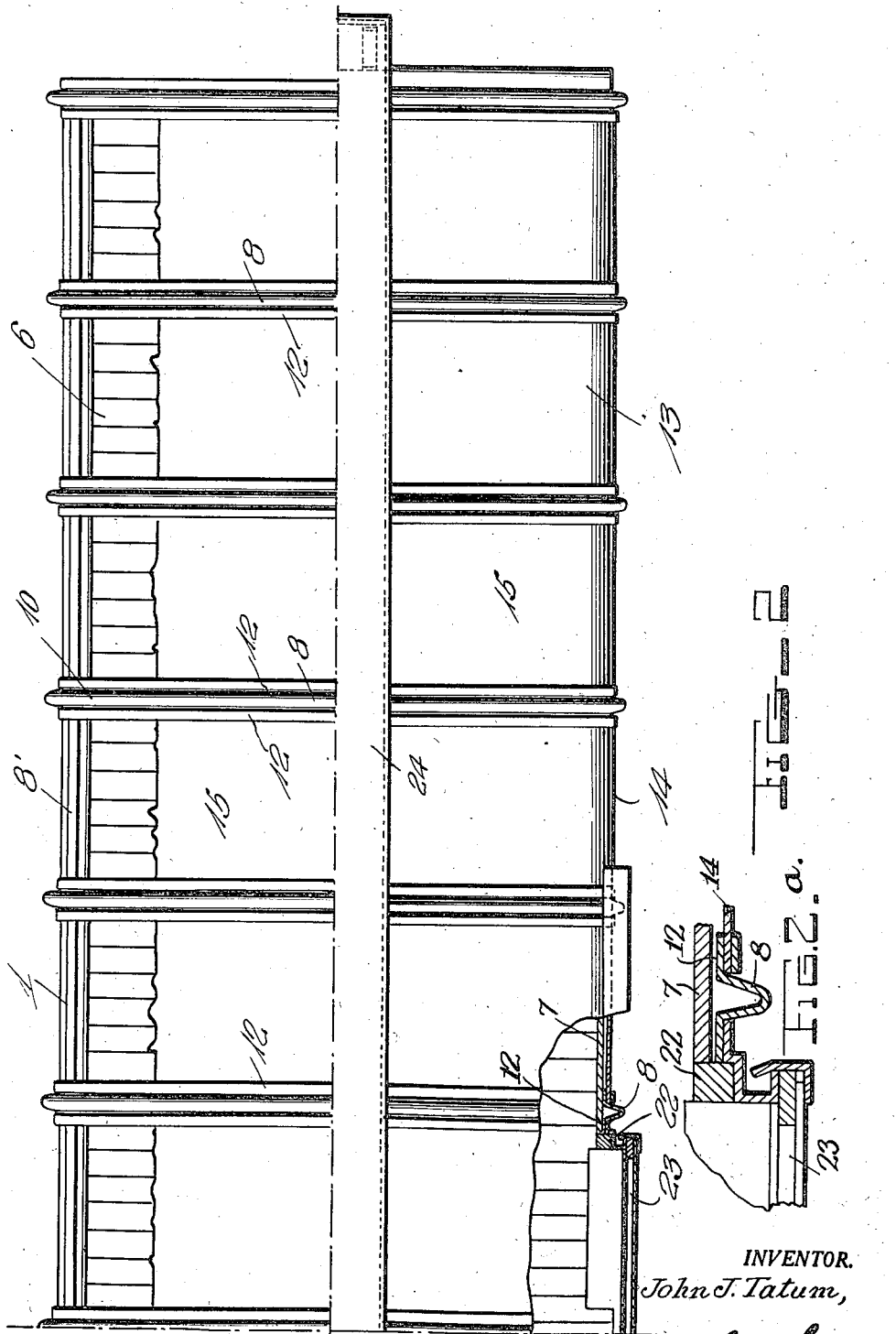

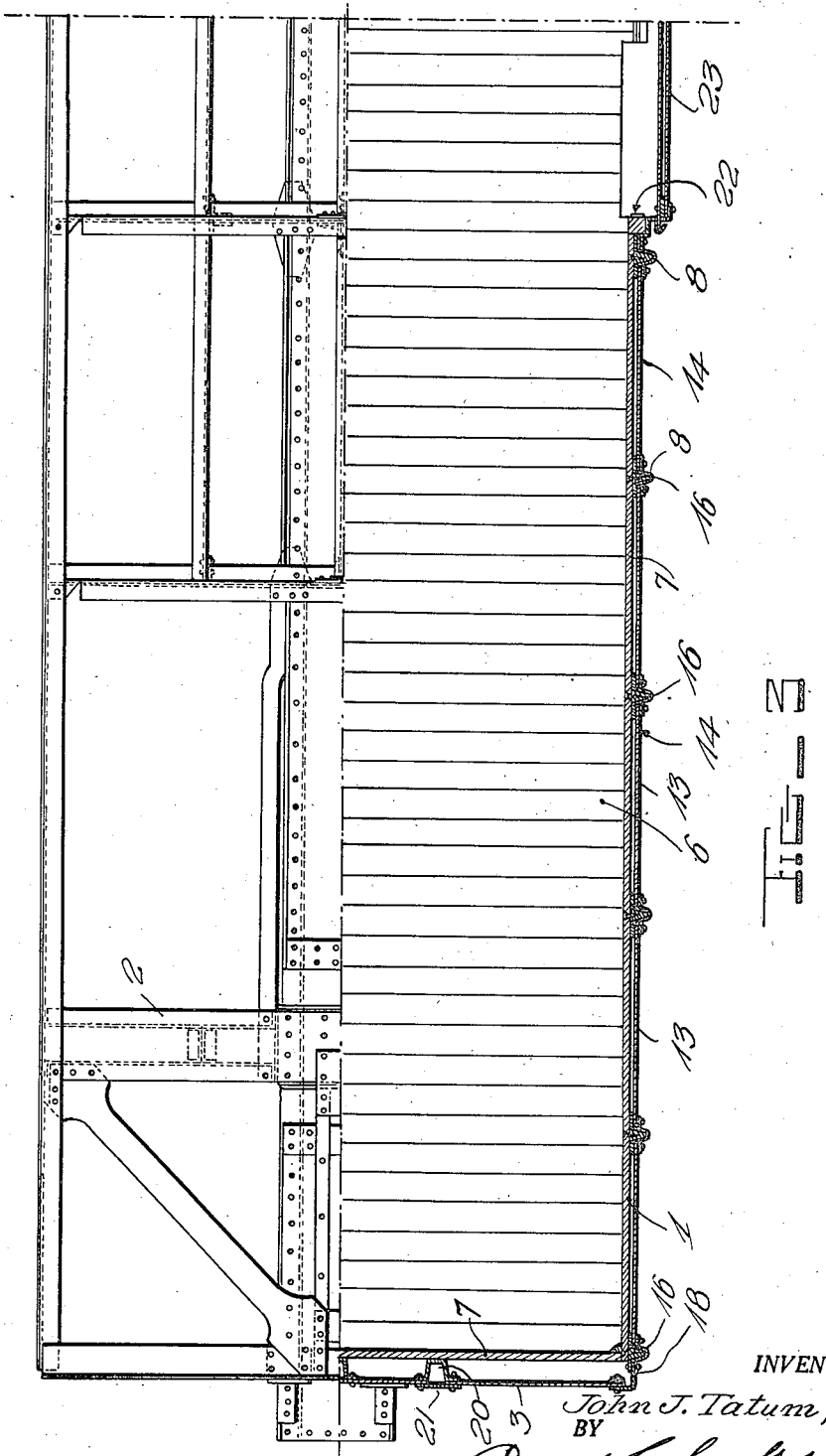

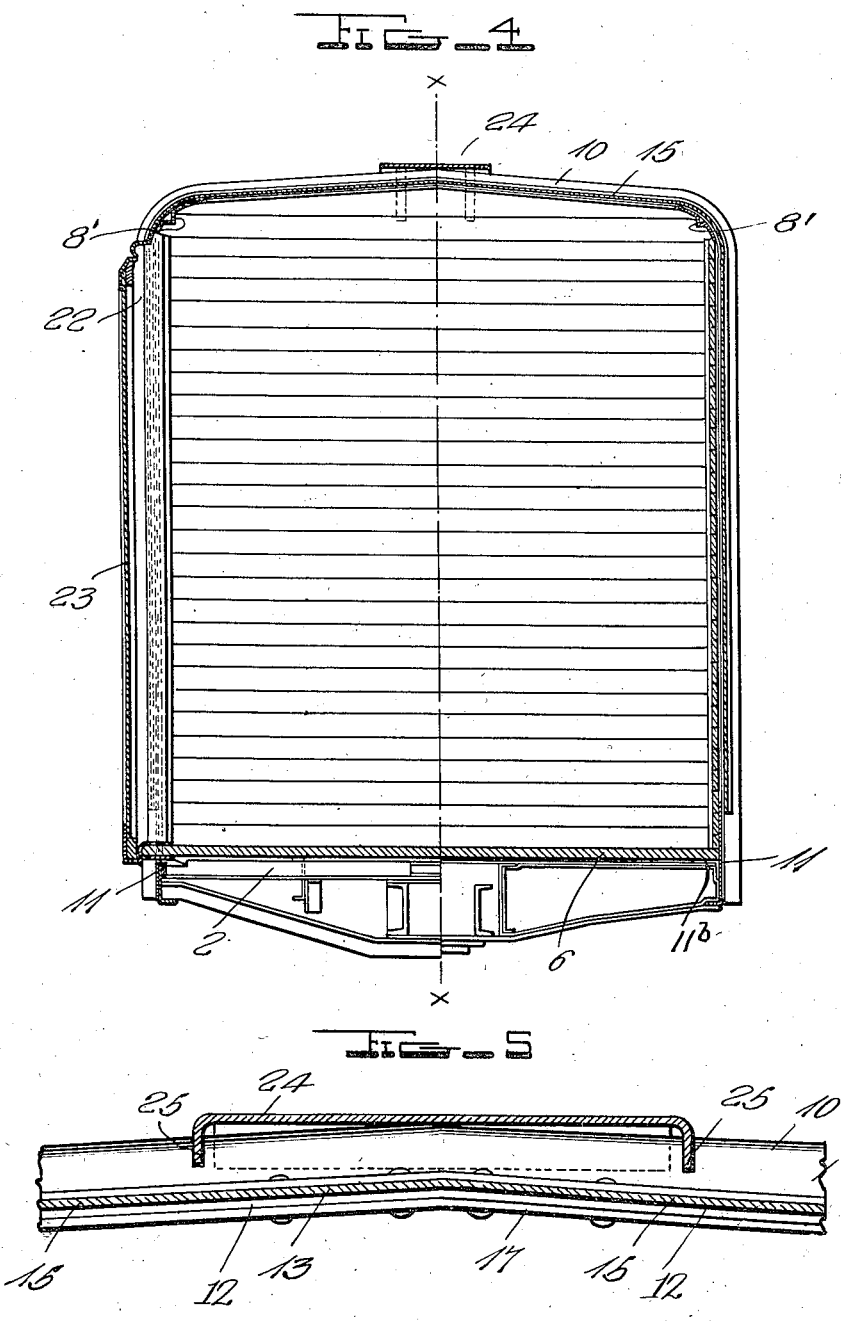

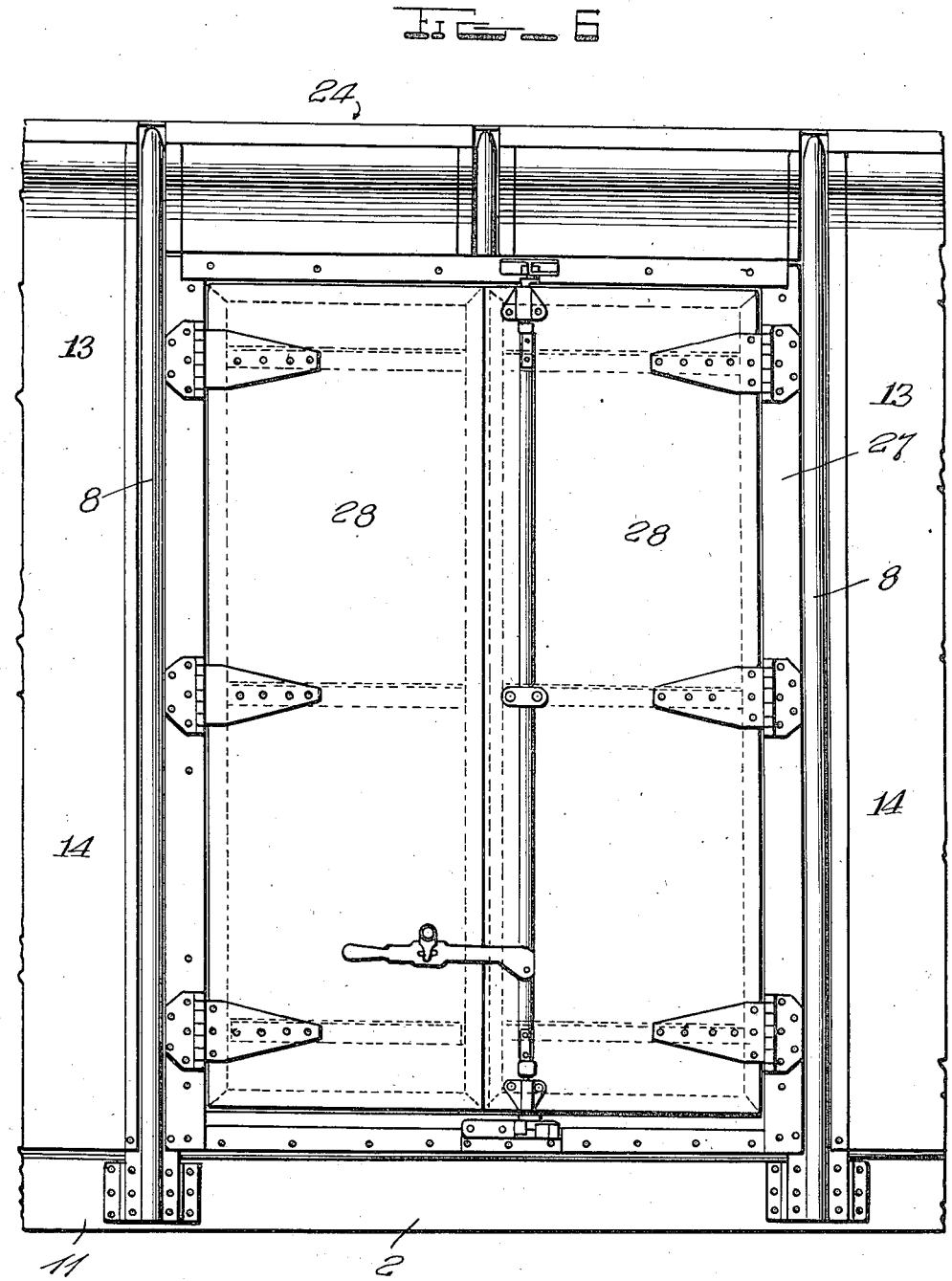

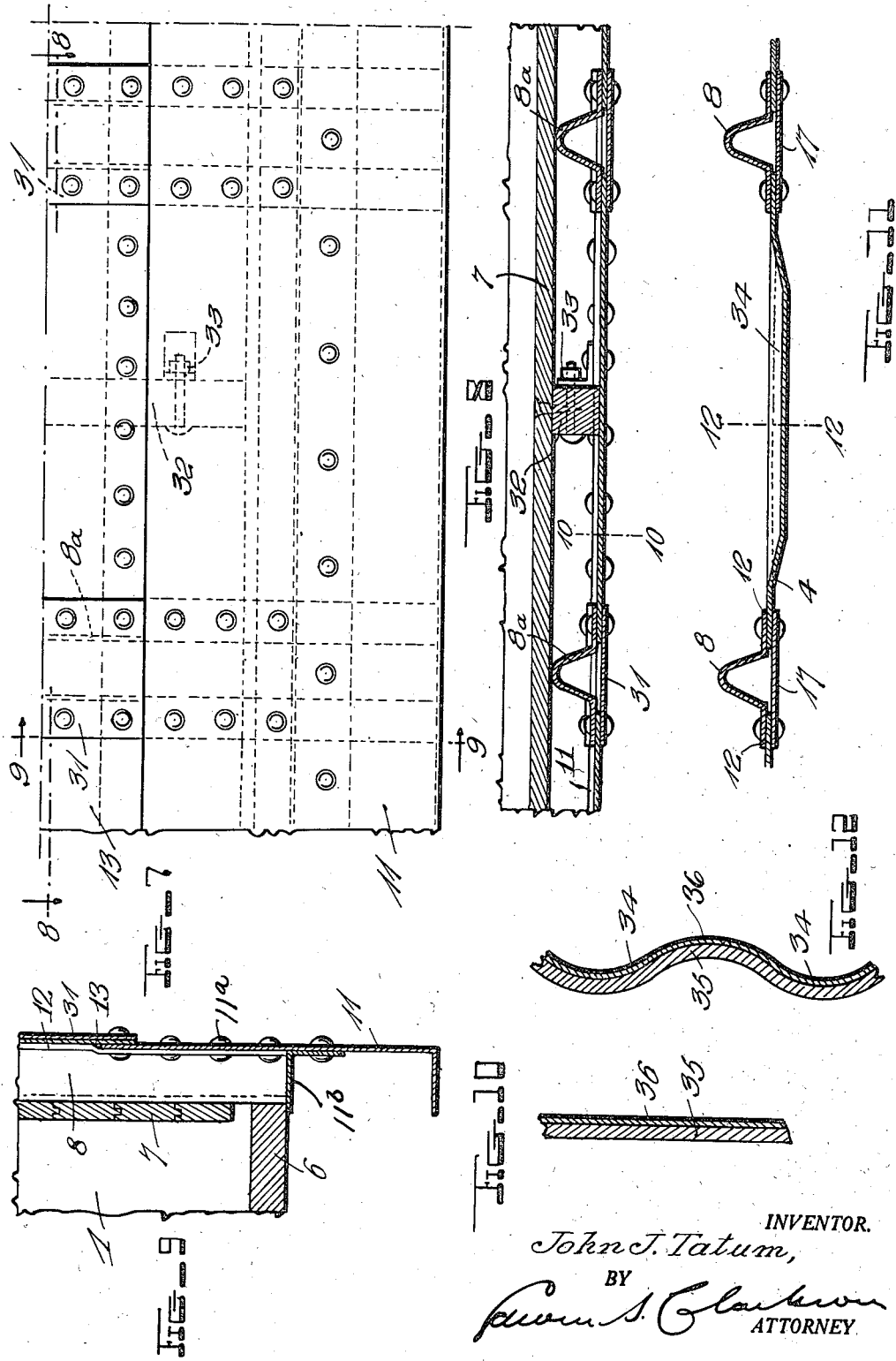

June 16, 1936. J. J. TATUM 2,044,515
CAR BODY CONSTRUCTION
Original Filed Aug. 9, 1934   7 Sheets-Sheet 7
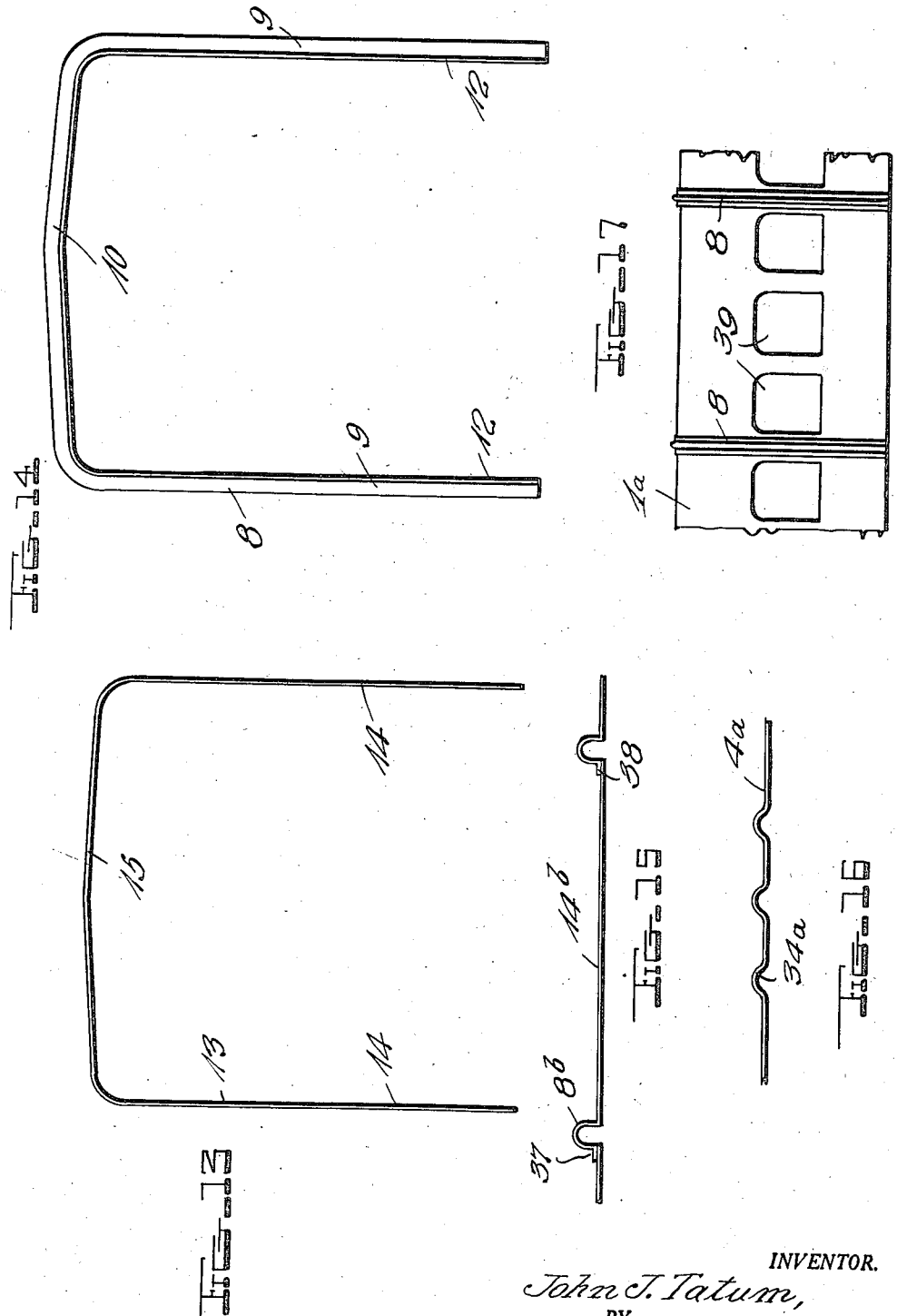
INVENTOR.
John J. Tatum,
BY
ATTORNEY.

Patented June 16, 1936

2,044,515

UNITED STATES PATENT OFFICE 2,044,515

CAR BODY CONSTRUCTION

John J. Tatum, Baltimore, Md.

Original application August 9, 1934, Serial No. 739,153. Divided and this application August 13, 1935, Serial No. 36,006

17 Claims. (Cl. 105—409)

This application is a division of my application filed August 9, 1934, Serial No. 739,153.

This invention relates to improvements in the construction of bodies of railway freight and passenger cars and like vehicles, and particularly to improvements in the construction of metallic car bodies, that is, car bodies in which at least the elements of the shell of the body, comprising the side and roof sheets and the coacting framing parts and connections, are formed of metal.

One object of the invention is to provide a metallic body construction of covered-wagon-type which is of maximum strength, lighter weight, comprises fewer parts, joints and seams, and which is of less cost in construction and maintenance then car bodies of prior constructions.

Another object of the invention is to provide a body construction of all-metal type which is less subject to distortion from weaving and other body movements and less liable to leakage and entrance of the elements to the inside of the car than car bodies of prior constructions, which allows a maximum of inside width to be obtained within American Railway Association clearance dimensions, and which comprises parts capable of being combined to facilitate and reduce working time in constructing the body.

Still another object of the invention is to provide a type of metallic car body structure including unitary frame elements extending transversely from side to side and across the roof and to near the bottom of the side walls, and coacting and similarly arranged sheet metal wall sections arranged between and united to the frame elements to form a body which is of maximum strength and resistance to weaving and distortion, but at the same time sufficiently elastic to sustain all surface shocks and jars without fracture or opening up of seams, and which is adapted for use in the construction of the bodies of both freight and passenger cars.

With these and other objects in view, the invention consists of the features of construction, combination and arrangement of parts, hereinafter fully described and claimed, reference being had to the accompanying drawings, in which:—

Fig. 1 is a view in side elevation, partly in vertical section, of one half of a freight car body constructed in accordance with the invention.

Fig. 2 is a top plan view, partly in section, of the remaining half thereof.

Fig. 2a is a detail section through a portion of the car body.

Fig. 3 is a view of the part of the body illustrated in Fig. 1 shown at one side of its longitudinal center in horizontal section above the floor line and having the floor boards removed at the opposite side of its longitudinal center to expose the underframe.

Fig. 4 is a vertical transverse section taken in two planes on opposite sides of its center line x—x through the car body.

Fig. 5 is a similar view on an enlarged scale through a portion of the roof, showing features of construction.

Fig. 6 is a fragmentary side elevation on an enlarged scale showing the application of outward swinging instead of sliding doors.

Fig. 7 is a view in elevation of the lower portion of a side wall of the body on an enlarged scale and disclosing a modified form of the frame members.

Fig. 8 is a horizontal section on line 8—8 of Fig. 7.

Fig. 9 is a vertical section on line 9—9 of Fig. 7.

Fig. 10 is a vertical section on line 10—10 of Fig. 8.

Fig. 11 is a horizontal section showing the use of a corrugated metal side sheet.

Fig. 12 is a vertical section on line 12—12 of Fig. 11.

Fig. 13 is an edge view of one of the sheet sections forming the side walls and roof of the body.

Fig. 14 is an edge view of one of the body frame members or beams.

Fig. 15 is a view showing a modification in which the body frame members are formed on and as unitary parts of the metal sheets.

Fig. 16 is a view of a sheet having reinforcing corrugations.

Fig. 17 is a fragmentary side elevation showing the embodiment of the invention in a passenger car body.

Referring now more particularly to the drawings, 1 designates a double walled car body constructed in accordance with my invention and 2 the car body underframe which may be of ordinary construction or suitably modified, when required, for the mounting of the double wall car body thereon.

The body 1 comprises generally double end walls 3, doubleside walls 4, a roof 5 and a single or double floor 6, and may be provided or not, as desired, upon the inner faces of its end and side walls with a lining 7 of boarding or other suitable material.

In its specific structural organization the body comprises a series of flanged trough-shaped frame members or beams 8 extending transversely of the car and arranged at spaced intervals apart from end to end of the car. Each of these frame members or beams is of arched or inverted U-form so as to provide a pair of vertically disposed side post portions 9 connected at their upper ends by a top cross piece or carline portion 10 which is preferably slightly curved or arched or so shaped as to be highest at a central point and thence inclined downwardly toward the post portions to give proper slope to the roof sheets, as hereinafter described. The post portions 9 are rigidly secured at their lower ends as at 11a to longitudinal plates or sheets 11 extending the length of the car at each side thereof and fastened to the underframe 2 so that the frame members 8 will be rigidly supported in position. These side plates or sheets 11 carry angle metal brackets 11b which extend under and support or assist in supporting the floor 6. Each frame member 8 is preferably of the cross-sectional form shown, that is, comprises a V or trough-shaped channeled body provided at each side with a laterally extending flange 12, the channels in the form of the invention shown in Figs. 1, 2, 3, 4 and 15 being arranged to face inwardly. Channeled longitudinal saddle or tie bars 8a may be fastened to the series of frame members at each side of the car to connect and hold the same against displacement longitudinally of the car.

The frame members 8 support the side and roof sheets which are formed of unitary sheet sections 13, each section being of inverted U-form and comprising side sheet portions 14 connected at their upper ends by a roof sheet portion 15 continuous therewith. Each unit 14 is of a width to fit in the space between the adjacent frame members 8 and to overlap the flanges 12 thereof, and said sheets are riveted or otherwise rigidly secured to said flanges and at their lower ends to the side longitudinal bottom side plates 11 or their equivalent. Where the channels of the frame members are arranged to face inwardly, as in the preferred form of construction, the channels of the side post portions may be utilized as holders to receive wooden filler strips 16 to which the lining or wall board 7 may be secured by suitable fastenings. While the channels of the carline portions may be closed by splice plates 17 secured by the same fastenings as the roof sheets to the frame members, and which splice plates may serve as brackets or supports for any contiguous fixtures employed in the roof zone of the car. The sides and roof of the car body thus formed will, it will be seen, consist of arched unitary frame members secured to and supported from the bottom side longitudinal side plates or sheets 11 and arched unitary sheet sections disposed between the frame members and which are also secured to the plates or sheets 11 and extend continuously from one side plate to the opposite side plate and across the roof to form in a single piece construction the side walls and roof of the car body. By this construction the car body may be quickly formed by simply assembling the elements of the frame and walls and fastening them together, providing a body structure which is largely free from joints, which is staunch and rigid and proof against weaving or becoming distorted under all ordinary maximum service strains, and which may be built rapidly and at a comparatively low cost. By using channeled frame members which are continuous from longitudinal bottom side sheets and over the roof, and attaching their sheet sections which are similarly continuous and fastened to said frame members, a structure is provided in which the body, while sufficiently rigid to stand weaving and distortion, is allowed to have a certain degree of elasticity by the channels of the frame pieces, so as to yield or give to certain degrees without liability of fracture or distortion or opening up of seams under the severest strains. By arranging the channels of the frame members so that their open sides project inwardly and the closed channels project outwardly beyond the surfaces of the wall sheets, the frame channels serve not only as elastic stiffening beams, but as guards to protect the metal walls from damage from external objects as well as to support running boards or other external fixtures as hereinafter described and also to act as baffles against the elements striking the sheet edges or joints. The end walls 4 of the body may consist of sheets of suitable width riveted or welded together at their adjacent edges and to angle members 18 and transverse end plates 19 attached to the flanges of the end frames and to the floor of the car. If desired, the end sheets may be formed of reinforcing channels 20, closed at their outer sides by bridge plates 21 and forming stays or abutments for the linings of the end walls, which may be fastened thereto if desired and to the linings of the side walls or other complementary parts of the wall structure.

In the embodiment of the invention in a freight car, the car body may be provided at each side with one or more doorway frames 29 for sliding doors 23. These frames may be conveniently fitted within a doorway opening formed by omitting portions of the flange of one of the frame members 8 and portions of the adjacent side sheets below the intended level of the lintels of the door frames and disposing the door frames in the double spaces thus created and securing them to the posts of the other contiguous frame members and the portions of the shortened frame member and sheets. The door frames thus arranged will coact with the frame members to which they are attached to give additional strength and rigidity to the body structure.

Where a running board or raceway is to be applied to the roof of the car, the carline portions of the frame members may be utilized to support the running board, which may be of novel construction for the purpose. The running board 24 herein shown is made of sheet metal and rests at the center of the roof upon the ridges of the carline portions 10 and is provided along its longitudinal edges with downturned flanges 25 with clear space above the roof sheets for train men to hold on to the edge of running board, said flanges being notched to receive the carline portions and fastened thereon, whereby the running board is firmly supported in place. The running board may be riveted, welded or otherwise secured to the roof carlines and its end extensions may be connected to and reinforced from the end sheets by braces 26. This provides a running board construction which is readily applicable to a body of the character described. It will be observed that by the construction described the carlines 10 serve as supports for the runway platform or running board at its center and each side and that the running board is longitudinally stiffened by its flanges to prevent sagging of the same under weight between the frame members, so that the runway platform will be firmly supported at all points throughout its length and may therefore be made of lighter metal than usual if desired.

Fig. 6 shows a construction in which swinging doors are employed in the sides of the car in lieu of sliding doors. The frame 27 of the doors 28 of this type may be fitted in place in openings in the side walls formed in the same manner as previously described in connection with the frame of sliding doors by the simple omission of side portions of plate between the frame members and portions of the side sheets of two additional sheet units.

By the formation of the body in the manner described it will be evident that a body structure is produced which is of maximum strength, lighter weight and comprises fewer parts, joints and seams than metallic car bodies of prior construction, and which is also less costly in production and maintenance. This construction of car body, because all of its parts are firmly combined and united with a material reduction of seams and joints, is not liable to distortion by weaving and other body working motions and is much less liable to leakage and the entrance of the elements to the interior of the car because of its staunchness of construction and the small number of joints and seams required. It is particularly strong and rigid and distortion resisting in the roof zone and, because of the compact form of its walls, may be made of maximum inside width while retaining its outside width safely within American Railway Association clearance dimensions. Other advantages in point of ease and simplicity of construction and reduction in maintenance costs will be obvious to those versed in railway car construction and operation.

Instead of forming and disposing the frame members so that their channels face inwardly, as above described, they may be formed and arranged so that their channels face outwardly, as shown particularly in Figs. 7, 8 and 9. When this construction and arrangement of the frame members 8a is employed the outwardly facing open sides of the channels of the frame members are closed by bridge or splice plates 31 which are riveted or otherwise firmly secured with the wall sheets to the frame members. With this construction the closed side of the frame members 8a may be arranged to form abutments against which the wall lining 7 bears and wooden nailing posts 32 may be secured on the inner sides of the sheets by bolts and brackets 33 to which the lining board 7 may be secured.

In all forms of the invention the metal sheeting composing the side, roof and end sheets may be suitably reinforced, as by providing the same with corrugations, extending either longitudinally or transversely thereof, so that the sheets themselves will be reinforced and rendered rigid to any desired degree. In Figs. 11 and 12 is shown a sheet 4 provided with transversely extending corrugations 34, while in Fig. 16 is shown a sheet 4a provided with vertical corrugations 34a.

In practice the frame members and the combination side and roof sheets are preferably, though not necessarily, made of veneered metal, that is to say, as indicated on an enlarged scale in Figs. 7 to 12, inclusive, of an outer layer 35 of a common or cheap grade of metal and an inner layer 36 of a choice metal, such as stainless steel or non-corrosive metal. This will permit, when desired, of the use of a wall without an inner lining, which wall will be provided with an inner surface of non-corrosive metal designed to come in contact with the lading, thus obviating liability of damage by some kinds of lading and at the same time ensuring longer life to the surfaces of the walls of the car which are subject to constant wear and corrosion by rubbing or other contact with lading.

In Fig. 15 I have shown a type of body forming construction of channeled frame members and wall forming sheets in which the frame members and wall sheets are unitarily constructed. As shown each wall sheet 14b is provided at one of its side edges with a channeled portion 8b constituting the frame member, at the outer side of which said edge of the sheet is provided with a lap flange 37, the side edges of the sheet opposite the frame member 8b and flange 37 being straight or lying in the plane of the body of the sheet, as indicated at 38. With this construction the sheets and their channeled frame members 8b are secured to the side sills or their equivalents of the underframe and are united to each other by lapping the flange 37 of one sheet over upon the edge 38 of the other and adjacent sheet and riveting or welding the same thereto.

The construction of car body herein shown and described is equally well adapted for use in connection with freight car bodies and passenger car bodies, or other vehicles, as in the embodiment of the invention in a passenger car body interior fixtures may be applied to the side and roof walls by the use of filler blocks in the channels of the frame members or attaching brackets or other means suitably secured to the frame members or sheets of the wall structure. In the construction of a car body for passenger use the body may be built up with sheets which are imperforate or have been previously perforated for the reception of the required window frames or windows. Where the car body is built up of imperforate sheets the windows, door and ventilation openings may be formed by simply outlining them at proper points and then employing an electric arc method or other suitable method of cutting out the metal along the indicated lines. This provides a method whereby the elements may be conveniently applied in position without liability of distortion and the openings then formed in the sheets of the built up structure.

In Fig. 17 I have shown such a portion of a car body 1a of a design suitable for passenger use and in which window openings 39 have been formed in the manner described.

A car body constructed in accordance with my invention may be used in converting wooden body cars into metal body cars by removing the wooden car body and mounting on the old car underframe my improved body. This may be done with little or no change in the underframe structure.

The troughs, or hollow portions 8a, of the arch frames, as shown in Figs. 7, 8 and 9 closed by the plates 3, also function as baffles against driving rain and other elements to prevent the elements from hitting the edges of the roof and side sheets where they are joined to the flanges of the arch frames, whereby the elements are prevented from passing inside of the car through said joints.

From the foregoing description, taken in connection with the accompanying drawings, the mode of construction of my improved car body and its advantages will be readily understood by those versed in the art without a further and extended description. It is to be understood that while the structures disclosed, for purposes of exemplification are preferred, changes in the form, construction and arrangement of the parts may be made within the scope of the appended claims, without departing from the spirit or sacrificing any of the advantages of the invention.

What I claim is:—

1. A car comprising a body formed of a series of sheet metal sections disposed side by side transversely of the body to provide a roof portion and opposite side wall portions continuous from side sill to side sill of the body, and arched channeled frame members of substantially U-shaped cross section extending continuously from the sill of one side of the body to the sill of the opposite side of the body and across the roof between adjacent sheet metal sections and uniting said sections to each other.

2. A car comprising a body formed of a series of sheet metal sections disposed side by side transversely of the body to provide a roof portion and opposite side wall portions continuous from side sill to side sill of the body, and arched channeled frame members of substantially U-shaped cross-section extending continuously from the sill of one side of the body to the sill of the opposite side of the body and across the roof between adjacent sheet metal sections and having flanges at opposite sides of their channels lapping the edges of the adjacent sheet metal sections and fastened thereto to connect said sheet metal sections and frame members together.

3. A car comprising a body formed of a series of sheet metal sections disposed side by side transversely of the body to provide a roof portion and opposite side wall portions continuous from side sill to side sill of the body, and arched channeled frame members of substantially U-shaped cross-section extending continuously from the sill of one side of the body to the sill of the opposite side of the body and across the roof between adjacent sheet metal sections and uniting said sections to each other, the channels having their closed sides facing outwardly and projecting beyond the sheets to form corrugated beams and guards to reinforce and protect the sheets from injury.

4. A car comprising a body formed of a series of sheet metal sections disposed side by side transversely of the body to provide a roof portion and opposite side wall portions continuous from side sill to side sill of the body, and arched channeled frame members of substantially U-shaped cross-section extending continuously from the sill of one side of the body to the sill of the opposite side of the body and across the roof between adjacent sheet metal sections and having flanges at opposite sides of their channels lapping the edges of the adjacent sheet metal sections and fastened thereto to connect said sheet metal sections and frame members together, the channels having their closed sides facing outwardly and projecting beyond the sheets to form corrugated beams and guards to reinforce and protect the sheets from injury.

5. A car comprising a body formed of a series of sheet metal sections disposed side by side transversely of the body to provide a roof portion and opposite side wall portions continuous from side sill to side sill of the body, and arched channeled frame members of substantially U-shaped cross-section extending continuously from the sill of one side of the body to the sill of the opposite side of the body and across the roof between adjacent sheet metal sections and uniting said sections to each other, said frame members having their closed sides facing outwardly and forming corrugated beams projecting beyond the outer surfaces of the sheets, and a running board extending along the roof of the body and seated on and supported by said beams and having depending grip flanges notched at the points of bearing of the running board on the beams to receive and interlock with said beams.

6. A car comprising a body formed of sheet metal sections disposed side by side transversely of the body and providing roof portions and two opposite side wall portions integrally continuous between the sills and across the roof of the body, said sections being formed at spaced intervals with channeled portions forming side posts and carline bearings integrally continuous with each other.

7. A car comprising a body formed of longitudinal bottom sheets at each side of the body, a series of metal sections disposed side by side transversely of the body to provide a roof portion and opposite side wall portions extending continuously from the bottom body longitudinal side sheet at one side of the car to the bottom body longitudinal side sheet at the other side of the car, and arched channel frame members of substantially trough-shaped cross-section fastened to and extending continuously from the bottom body longitudinal side sheet on one side of the car to the bottom body longitudinal side sheet on the opposite side of the car and across the roof between adjacent sheet metal sections and uniting said sections to each other.

8. A car comprising a body formed of longitudinal bottom side plates fastened to the underframe at each side of the car, a series of sheet metal sections disposed side by side transversely of the body to provide a roof portion and opposite side wall portions fastened to and extending continuously between said longitudinal bottom side plates and across the roof of the car body, and arched channel frame members of substantially U-shaped cross-section extending continuously from the longitudinal bottom side plate at one side of the car to the longitudinal bottom side plate at the opposite side of the car and across the roof between adjacent sheet metal sections and having flanges at opposite sides of their channels lapping the edges of the adjacent sheet metal sections and fastened thereto, connecting said sheet sections and frame members together and with the longitudinal bottom side plates on opposite sides of the body, the channels having their closed sides facing outwardly and projecting beyond the sheets to form corrugated beams and guards to reinforce and protect the sheets from injury.

9. A car comprising a body formed of longitudinal bottom side plates or sheets fastened to the underframe at each side of the car, a series of sheet metal sections disposed side by side transversely of the body to provide a roof portion and opposite side wall portions extending continuously from one longitudinal bottom side plate to the other longitudinal bottom side plate and across the roof of the car, arched channel frame members of substantially U-shaped cross-section extending continuously from the longitudinal bottom plate at one side of the car to the longitudinal bottom side plate at the opposite side of the car and across the roof between adjacent sheet metal sections, and uniting said sections to each other, said frame members having their closed sides facing outwardly and forming corrugated beams projecting beyond the outer surfaces of the sheets, and a running board extending along the roof of the body supported centrally by the corrugated roof beams and having depending grip flanges notched at the points of bearing of the running board on the beam to receive and interlock with said beams.

10. A car body formed of sheet metal sections disposed side by side transversely of the body and providing roof portions and two opposite side wall portions, said sections being formed at spaced intervals with channeled portions forming side posts and carline bearings integrally continuous with each other.

11. A car body structure comprising, in combination with an underframe, arched sheet sections forming side and roof sheets extending continuously from the underframe at opposite sides of the car across the roof, and arched trough-shaped members disposed between the edges of and attached to and joining said sheet sections.

12. A car body comprising, in combination with an underframe, arched sheet metal sections, forming transverse divisions of the body, each comprising side sheet portions and a roof sheet portion integrally continuous with each other, and correspondingly shaped stiffening members trough-shaped in cross-section extending along the division lines between the sheet sections and uniting the side and roof sheet portions of the sheet sections to each other, and longitudinally extending side plates fastened to said sheet sections and stiffening members and to the car underframe.

13. A car body comprising sheet metal sections arranged side by side and forming side wall and roof portions, frame members arranged between the adjacent edges of the sheet sections and each of unitary construction to provide posts at opposite sides of the body and a carline across the roof of the body, said post and carline portions of the frame members being of trough shape in cross section and having lateral flanges in lapping arrangement with said edges of the sheet sections and secured thereto to join the sections together, and side plates extending continuously along each side of the car at the base thereof and tying the lower edges of the side wall portions of the sheet sections and the lower ends of the post portions of the frame members together.

14. A car body comprising sheet metal sections arranged side by side and forming side wall and roof portions, frame members arranged between the adjacent edges of the sheet sections and each of unitary construction to provide posts at opposite sides of the body and a carline across the roof of the body, said frame members being of trough shape in cross-section throughout its post and carline portions and having lateral flanges in lapping arrangement with said edges of the sheet sections and secured thereto to join the sections together, the channels of said trough-shaped frame members projecting outwardly beyond the side wall and roof portions of the sheets, and side plates extending continuously along each side of the car at the base thereof and tying the lower edges of the side wall portions of the sheet sections and the lower ends of the post portions of the frame members together.

15. A car body formed of a series of sheet metal sections disposed side by side transversely of the body to provide a roof portion and opposite side wall portions, and arched channeled frame members of trough-shaped cross-section extending between and elastically connecting the adjacent edges of said sheet metal sections together.

16. A car body formed of a series of sheet metal sections disposed side by side transversely of the body to provide a roof portion and opposite side wall portions, and arched channeled frame members of trough-shaped cross-section each integral with one edge of each sheet metal section and elastically connecting the same with the adjoining edge of an adjacent sheet metal section.

17. A car body formed of a series of sheet metal sections disposed side by side transversely of the body to provide a roof portion and opposite side wall portions, arched channeled frame members of trough-shaped cross-section extending between and elastically connecting the adjacent edges of said sheet metal sections together, and side plates extending along the bottom of each side of the body and joining the base portions of the sheet metal sections and frame members together.

JOHN J. TATUM.